No. 755,201. Patented March 22, 1904.

UNITED STATES PATENT OFFICE.

JOHN FLEMING WHITE, OF BUFFALO, NEW YORK, ASSIGNOR TO GENERAL CHEMICAL COMPANY, OF NEW YORK, N. Y., A CORPORATION OF NEW YORK.

PROCESS OF MANUFACTURING SODIUM SULFID.

SPECIFICATION forming part of Letters Patent No. 755,201, dated March 22, 1904.

Application filed December 27, 1902. Serial No. 136,782. (No specimens.)

*To all whom it may concern:*

Be it known that I, JOHN FLEMING WHITE, a citizen of the United States, and a resident of Buffalo, county of Erie, State of New York, have invented certain new and useful Improvements in Processes of Manufacturing Sodium Sulfid, of which the following is a specification.

My invention relates to the manufacture of sodium sulfid; and it consists in substituting niter cake and salt for sodium sulfate in manufacturing sodium sulfid with the aid of coal. Niter cake is obtained as a by-product in many chemical works manufacturing acids and is for the most part acid sodium sulfate, ($NaHSO_4$.) It is very cheap.

According to my invention the crude acid sodium sulfate, commonly known as "niter cake," and salt are mixed with coal, and the reaction is brought about by heating the mixture in an open furnace or other suitable apparatus. The salt (NaCl) acts on the acid sulfate of sodium ($NaHSO_4$) and forms neutral sulfate of sodium and hydrochloric acid. The sulfate of sodium ($Na_2SO_4$) is then reduced to sodium sulfid ($Na_2S$) by the action of the coal. A general idea of the action of the salt and coal on pure acid sodium sulfate may be obtained from the following chemical equations:

$$NaHSO_4 + NaCl = Na_2SO_4 + HCl.$$
$$Na_2SO_4 + 2C = Na_2S + 2CO_2.$$

The carbonic dioxid ($CO_2$) is reduced to carbonic monoxid (CO) by the reducing action of the excess of coal which is added in my process over that required by the above chemical equation. The sodium sulfid is therefore not decomposed by the carbonic dioxid, ($CO_2$.)

An example of my process is given as follows: Six parts of niter cake are mixed with two parts of salt and four and one-fourth parts of coal (all parts being by weight) and heated in an open furnace or other suitable heating apparatus. The mixture becomes a thin paste or liquid. The reaction begins promptly and progresses rapidly when the temperature is increased to incipient red heat. The operation is completed in about two hours.

It will be observed that hydrochloric acid is formed as a by-product, and this adds to the value of my improved process. If the above-described mixture is heated in a closed muffle-furnace, the hydrochloric acid can be saved.

The main advantage of this method is the use of cheap niter cake, which is a waste product in many acid-factories, for the production of sodium sulfid.

I claim as my invention and desire to secure by Letters Patent—

The process of producing sodium sulfid, which consists in heating niter cake in the presence of coal and salt.

JOHN FLEMING WHITE.

Witnesses:
THEO. V. FOWLER,
EMILE V. PINCOTT.